United States Patent [19]

Ruiz

[11] Patent Number: 4,589,124
[45] Date of Patent: May 13, 1986

[54] X-RAY FILM HOLDER FOR PATIENT IN WHEELCHAIR

[76] Inventor: Gilbert G. Ruiz, 2614 N. Sterling Dr., McHenry, Ill. 60050

[21] Appl. No.: 611,992

[22] Filed: May 18, 1984

[51] Int. Cl.[4] .................. G03B 42/02; A61B 6/08; H05G 1/00; A47C 7/62
[52] U.S. Cl. ................................ 378/178; 378/181; 378/205; 378/208; 280/289 WC; 280/289 A; 297/188; 297/191
[58] Field of Search ............... 378/178, 181, 177, 205, 378/208; 280/289 WO, 289 A; 297/188, 191

[56] References Cited

U.S. PATENT DOCUMENTS

| | | | |
|---|---|---|---|
| 3,626,186 | 12/1971 | Allard et al. | 378/178 |
| 3,694,653 | 9/1972 | Allard et al. | 378/178 |
| 3,795,815 | 3/1974 | Weinstock et al. | 378/178 |

Primary Examiner—Richard L. Schilling
Attorney, Agent, or Firm—Lee, Smith & Zickert

[57] ABSTRACT

A portable X-ray film cassette holder for a wheelchair is disclosed whereby the patient can remain stationed in the wheelchair and need not be removed therefrom for X-ray photography. The cassette holder has quickly adjustable mounting means enabling the holder to be used with differently sized wheelchairs and further provides portability for expeditiously taking sequential photographs of different wheelchair-bound patients.

9 Claims, 3 Drawing Figures

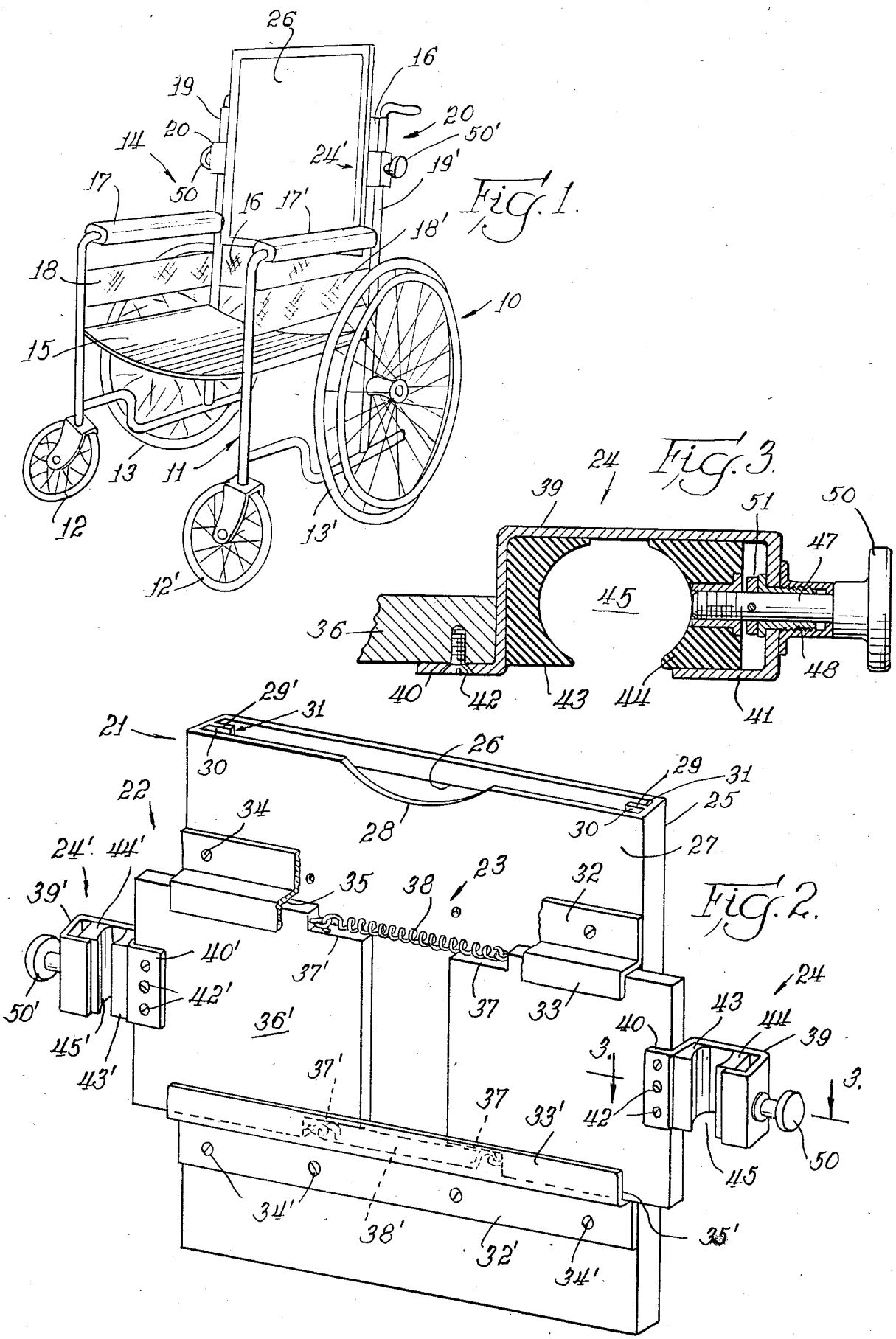

X-RAY FILM HOLDER FOR PATIENT IN WHEELCHAIR

BACKGROUND AND SUMMARY OF THE INVENTION

The invention relates to the taking of X-ray photographs of a patient while seated in a wheelchair. More particularly, the invention provides a portable X-ray film cassette holder which is mountable on a wheelchair and is adjustable for use with variously sized wheelchairs.

In the past, non-ambulatory patients who were confined to wheelchairs were nonetheless required to be lifted from the wheelchair onto the X-ray table. While not only providing discomfort for the patient, proper X-ray photography was hampered by moving the patient, particularly in conjunction with chest X-rays. Obtaining an accurate picture of fluids collecting in the patient's lungs is critical. Since these fluids reside at the bottom of the lungs when the chest is in the upright position, a true evaluation of their amounts and compositions is precluded by moving the patient from the chair to the examining table, which disturbs the fluid levels.

The present invention solves these problems by providing a very quickly adjustable film cassette holder which permits use with successive wheelchair patients and makes possible the close positioning of the film to the patient.

By using the cassette holder of this invention in conjunction with a wheelchair, a great advance in the medical arts is accomplished by permitting the patient to remain stationed in the wheelchair during examination.

The invention also provides for the quick replacement of exposed X-ray film cassettes with new cassettes whereby a series of pictures may easily be taken. Additionally, the invention provides means for releasably positioning a filter grid in front of the X-ray film to avoid clouding and distortion of the exposed film.

The portability of the cassette holder is made possible by the association of a cassette retaining means with an adjustable mounting means. The mounting means permits a releasable locking of the holder to chair frame members by the provision of opposing locking means. Additionally, a variable spacing means comprises a part of the mounting means and is movably mounted to the rear of the holder. The spacing means carries the opposing locking means whereby to adjust their spacing.

The inventive cassette holder allows for successively taking photographs of a patient in one chair, and then may be quickly detached and mounted on a second chair for examination of the next patient.

BRIEF DESCRIPTION OF THE DRAWINGS

In the Figures like reference numerals refer to the same elements throughout, as will hereinafter be described, wherein:

FIG. 1 is a perspective view of a wheelchair in combination with the portable X-ray cassette film holder in accordance with the invention;

FIG. 2 is a perspective view of the cassette holder as shown in FIG. 1 looking downwardly and at the back thereof;

FIG. 3 is a horizontal cross-sectional view of a locking means portion of the film cassette holder taken generally along lines 3—3 of FIG. 2.

DESCRIPTION OF THE PREFERRED EMBODIMENT

In a more detailed explanation of the invention, reference is now made to the preferred embodiment shown in the Figures wherein a conventional wheelchair 10 is detachably engaged by portable X-ray film cassette holder 20.

Wheelchair 10 comprises a support frame 11 mounted on a pair of front wheels 12, 12' and rear wheels 13, 13', in a typical construction. Frame 11 supportively associates with a chair means 14 having a seat 15, backrest 16, armrests 17, 17' and side guards 18, 18'. The chair means being provided for the seated stationing of a patient transported in the wheelchair.

Frame 11 also includes spaced-apart frame members 19, 19' extending generally adjacent the chair means 14 at the backrest 16 thereof. In the disclosed embodiment, holder 20 is detachably engaged between the two spaced apart frame members 19, 19' whereby to facilitate close positioning of an X-ray film cassette near the upper chest of the patient.

The construction of holder 20 is best understood with reference to FIG. 2 wherein it will be seen that holder 20 comprises a grid and film retaining means 21 supportively associating with a mounting means 22. The mounting means includes an adjustable spacing means 23 carrying opposing locking means 24, 24' for attachment to the frame members 19, 19'.

The retaining means 21 comprises a panel 25 having at the backrest-adjacent side an open front 26. The back face 27 of panel 25 is solid and generally rectangular as shown, except for an upper access cutout 28 to enable grasping grid and film cassettes held in retaining means 21. Between the open front side 26 and back face 27, elongate separators 29, 29' project inwardly of panel 25 to thereby form a rearward cassette slot 30 and a forward filter grid slot 31. This arrangement enables the positioning of a filter grid between the film and an X-ray machine, which is desirable in X-ray photography to avoid blurring on the exposed film. A filter grid and film cassette are thereby easily placed interiorly of panel 25 from the top thereof either before mounting holder 20 to wheelchair 10 or afterwards.

Retaining means 21 is supported by the mounting means 22 as now will be explained. Means 22 includes opposing L-shaped mounting brackets 32, 32' which have flanges 33, 33' extending from the shorter legs thereof. The longer legs of brackets 32, 32' are affixed to the back face 27 by means of mechanical fasteners 34, 34'. Brackets 32, 32' thereby provide grooves 35, 35' formed between the back face 27 and flange 33, 33'. Mounting means 22 further includes a spacing means 23 cooperative with the opposing grooves 35, 35' and comprises a pair of movable boards 36, 36'. Each movable board has upper and lower notches 37, 37' for the accommodation of spring means 38, 38' which resiliently connect the boards. The notches 37, 37' permit the spring means 39, 39' to be recessed for movement within grooves 35, 35', as best viewed in FIG. 2 at the centrally cut-away portion of upper bracket 33. The height of boards 36, 36' is slightly less than the distance between the brackets whereby they are slidable in the grooves.

Mounting means 22 further includes locking means 24, 24' which are mounted to and carried by movable boards 36, 36' whereby spacing means 23 is capable of varying the distance therebetween. The variable spacing feature enables holder 20 to be useable with a wide variety of wheelchairs having frame members with different spacings.

In the preferred form, locking means 24, 24' are mirror images. Accordingly, the cross-sectional view of FIG. 3 for locking means 24 will serve to explain the identical construction of means 24'.

Locking means 24 comprises a block C-shaped channel bracket 39 having flanges 40 and 41 extending from the tips of the short arms of the C-shape in substantially the same direction. Flange 40 provides for the attachment of bracket 39 to movable board 36 by means of screw fasteners 42. Arranged interiorly of bracket 39 is a stationary jaw 43 and a movable jaw 44. The jaws have opposing concave faces creating a frame-receiving space 45 between them. Jaw 43 is fixedly secured the bracket for substantially the full height thereof. Movable jaw 44 is movable relative to jaw 43 and is confined within bracket 39 by flange 41. Jaw 44 has a threaded sleeve 46 extending therethrough which is thread-engaged to, and supported by, a shaft 47. Shaft 47 extends from jaw 44 outwardly of bracket 39 inside a ferrule 48 extending therethrough. The exterior of ferrule 48 is threaded for engagement with a sleeve 49. Shaft 47 extends outwardly beyond sleeve 49 and is rigidly secured to a knob 50. Shaft 47 also carries a stop 51 which is fixedly secured thereto interiorly of bracket 39 and adjacent ferrule 48. Thereby, upon the rotation of knob 50, shaft 47 threadably engages or disengages sleeve 46 whereby to move jaw 44 relative to jaw 43. Frame member 19 is thereby releasably clamped within receiving space 45 when knob 50 is rotated to move jaw 44 into snug contact with the frame member. The adjustability of jaw 44 permits holder 20 to be useful with frame members having different thicknesses.

In preferred form, jaws 43 and 44 comprise a hard durable plastic which effectively clamps frame members without marring them.

Holder 20, in combination with wheelchair 10, provides a significant improvement of X-ray photography methods involving wheelchair-confined patients. In particular, the improved method can begin with the patient to-be-examined is transported to the X-ray laboratory while seated in the wheelchair 10. At the required time, portable film cassette holder 20 is mounted to the frame members 19, 19' by means of first spacing boards 36, 36' apart the appropriate distance to position frame receiving portions 45, 45' at the same spacing as between members 19, 19'. Thereafter, holder 20 and the locking means 24, 24' are moved toward the frame members 19, 19' whereby to position the frame members within the receiving portions 45, 45'. Knobs 50, 50' are then turned to clamp the frame members between jaws 43, 44 and 43', 44', respectively. An X-ray film cassette, and filter grid if required, are then placed into holder 20 at retaining means 21 thereof. Re-adjustment of locking means 24, 24' along the frame members may be required whereby to place holder 20 in a pre-selected position relative to the area of the patient's body to be photographed. Positioning the film at the proper distance from the X-ray machine is simply achieved by rolling wheelchair 10 toward or away from the machine as needed for the proper exposure of the film. Generally, about 72 inches between the film and an X-ray machine is a standard distance. Ultimately, the patient is exposed to X-rays directed at the area of examination whereby the image is made on the film cassette.

If additional photographs are required, the exposed film cassette can be simply lifted from retaining means 21 and replaced with a new one. When completed, holder 20 may be simply detached from the wheelchair frame by untightening knobs 50 and 50' to unclamp the frame members and thereafter remove holder 20. A next patient in a wheelchair may then be brought into the laboratory and portable holder 20 can be quickly mounted to the frame. The invention thereby provides a method for quickly taking X-ray photographs of successive patients without the need for extricating them from their wheelchairs and placing them on an examination table, or the like. Thus, patients are relieved of added discomfort which is especially a concern for the seriously ill and non-ambulatory. In the past, extra personnel have been required in order to lift and position such patients. Also, when a physician is attempting to determine fluid level in the lungs, it is of great benefit to have the patient's chest remain in an upright position and not disturb the fluid.

While the invention has been described with respect to a preferred embodiment, it is envisioned that holder 20 may be mounted in various arrangements between spaced apart frame members and is thereby not limited to the orientation prescribed by the vertical spaced apart relationship of frame members 19, 19'.

Further, locking means 24, 24' are not limited to a configuration whereby the receiving portions 45, 45' open in a direction away from panel 25. For example, means 24, 24' may be inverted whereby flanges 40, 40' would be affixed at their opposite face to back face 27 so that the receiving portions 45, 45' open toward panel 25.

Therefore, a broad range of equivalent structures are considered to fall within the ambit of the invention and scope of the claims appended hereto.

What is claimed is:

1. A wheelchair comprising a supporting frame having frame members supportively associating with a chair means, said frame being mounted on wheels, and said frame including spaced-apart frame members arranged adjacent said chair means, in combination, a portable X-ray film cassette holder detachably mounted with said spaced-apart frame members, said holder comprising retaining means for removably retaining an X-ray film cassette adjacent said chair means, said retaining means supportably associating with means for mounting said holder to said frame members, said mounting means including adjustable spacing means carrying opposing frame-engageable locking means, and said spacing means being capable of varying the distance between the locking means, said locking means having frame member receiving portions and means for releasably clamping frame members at said receiving portions whereby said holder is detachably mounted to said wheelchair and said mounting means provides adjustability enabling the use of said holder with frame members having different sizes and different spacings therebetween, and whereby said holder enables X-ray photography of a patient to be achieved whilst the patient is stationed in the wheelchair.

2. The combination as claimed in claim 1 wherein said retaining means includes means for removably retaining a filter grid between an X-ray film cassette and an X-ray machine.

3. The combination as claimed in claim 1 wherein said chair means includes a backrest and said spaced-apart members being vertically arranged adjacent thereto whereby said film cassette holder is mounted to dispose an X-ray film cassette behind the backrest to enable upper chest X-ray examination.

4. An improved X-ray film cassette holder for X-ray photography of a patient stationed in a wheelchair of the type having a supporting frame supportively associating with a chair means, said frame being mounted on wheels, and said frame including spaced-apart frame members arranged adjacent the chair means, the improvement comprising a portable X-ray film cassette holder capable of retaining a film cassette adjacent the chair means and being detachably mountable with the spaced-apart frame members, said holder comprising retaining means for removably retaining an X-ray film cassette, said retaining means supportably associating with means for mounting said holder to said frame members, said mounting means including adjustable spacing means carrying opposing frame-engageable locking means, and said spacing means being capable of varying the distance between the locking means, said locking means having frame members receiving portions and means for releasably clamping frame members at said receiving portions whereby said holder is detachably mountable to said type of wheelchair and said mounting means provides adjustability enabling the use of said holder with frame members of other such wheelchairs having different sizes and different spacings therebetween, and whereby said holder enables X-ray photography of a patient to be achieved whilst the patient is stationed in the wheelchair.

5. The improvement as claimed in claim 4 wherein said retaining means includes means for removably retaining a filter grid between an X-ray film cassette and an X-ray machine.

6. The improvement as claimed in claim 4 wherein said chair means includes a backrest and said spaced-apart members being vertically arranged adjacent thereto whereby said film cassette holder is mounted to dispose an X-ray film cassette behind the backrest to enable upper chest X-ray examination.

7. A portable X-ray film cassette holder for use with wheelchairs to enable the taking of X-ray photographs while a patient is stationed in the wheelchair, said cassette holder comprising retaining means for movably retaining an X-ray film cassette, said retaining means supportably associating with means for mounting said holder to a wheelchair, said mounting means including adjustable spacing means carrying opposing locking means, and said spacing means being capable of varying the distance between the locking means, said locking means having receiving portions for the receipt of frame members of a wheelchair and means for releasably clamping frame members thereat, whereby said cassette holder is detachably mountable to wheelchairs, and said mounting means being adjustable to enable the use of said cassette holder with wheelchairs of differently sized and spaced frame members, whereby said portable cassette holder enables X-ray photography of patients to be achieved while they are stationed in wheelchairs.

8. The holder as claimed in claim 7 wherein said retaining means includes means for removably retaining a filter grid between an X-ray film cassette and an X-ray machine.

9. The holder as claimed in claim 7 wherein said mounting means is mountable with wheelchairs having chair means including a backrest, and spaced-apart frame members vertically arranged adjacent thereto whereby said film cassette holder is mountable to dispose an X-ray film cassette behind the backrest to enable upper chest X-ray examination.

* * * * *